US008225217B2

(12) United States Patent
Allor et al.

(10) Patent No.: US 8,225,217 B2
(45) Date of Patent: Jul. 17, 2012

(54) METHOD AND SYSTEM FOR DISPLAYING INFORMATION ON A USER INTERFACE (75) Inventors: Jason Michael Allor, Seattle, WA (US); Kenneth Van Hyning, North Bend, WA (US); Stephen Thomas Kelly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 10/158,244

(22) Filed: May 30, 2002

(65) Prior Publication Data
US 2003/0222904 A1 Dec. 4, 2003

(51) Int. Cl.
G06F 3/00 (2006.01)

(52) U.S. Cl. ........ 715/749; 715/744; 715/745; 715/760; 715/764; 715/866

(58) Field of Classification Search ................. 715/513, 715/517, 515, 530, 749, 744, 745, 746, 747, 715/760, 764, 768, 866
See application file for complete search history.

(56) References Cited

U.S. PATENT DOCUMENTS

| | | | | |
|---|---|---|---|---|
| 6,446,111 B1* | 9/2002 | Lowery | ........................ | 709/203 |
| 6,784,900 B1* | 8/2004 | Dobronsky et al. | ............ | 715/744 |
| 6,791,581 B2* | 9/2004 | Novak et al. | ................... | 715/744 |
| 6,799,299 B1* | 9/2004 | Li et al. | ........................ | 715/513 |
| 7,093,198 B1* | 8/2006 | Paatero et al. | ................ | 715/746 |
| 7,895,530 B2* | 2/2011 | Leavitt et al. | ................. | 715/810 |
| 2002/0104096 A1* | 8/2002 | Cramer et al. | ................ | 725/113 |
| 2002/0152244 A1* | 10/2002 | Dean et al. | .................... | 707/530 |
| 2002/0156815 A1* | 10/2002 | Davia | ........................... | 707/517 |
| 2002/0174135 A1* | 11/2002 | Pellegrin et al. | ............. | 707/200 |
| 2003/0025732 A1* | 2/2003 | Prichard | ....................... | 345/765 |
| 2003/0126136 A1* | 7/2003 | Omoigui | ......................... | 707/10 |
| 2004/0205473 A1* | 10/2004 | Fisher et al. | .................. | 715/500 |
| 2005/0278726 A1* | 12/2005 | Cano et al. | ..................... | 719/315 |
| 2006/0107217 A1* | 5/2006 | Lu et al. | ........................ | 715/733 |

OTHER PUBLICATIONS

*Headline Viewer Skin Creation Guide*, Vertex Development, pp. 1-14, (1999-2001).
Bridgman, *A New Skin for Windows Media Player*, Microsoft, pp. 1-6 (Sep. 2001).
*Higher User Experience With Animated Menus*, Animated Menus, Inc. pp. 1-3 (1997-2002).
*Animated Menus XP*, Animated Menus, Inc., pp. 1-5, (1997-2002).
*What Is Animated Menus?*, Animated Menus, Inc., pp. 1-4 (1997-2002).
What's New in Animated Menus?, Animated Menus, Inc. pp. 1-4, (1997-2002).
*Thirty4Interactive skinz:*, thirty4 interactive LLC, pp. 1-3 (2001).
*GDAM*, www.ffem.org/gdam pp. 1-2 (Feb. 2001).
*Adding Media Skins Using the QuickTime API*, Apple Computers, pp. 1-3 (2001).
*Windows Managers::KDE*, thirty4 interactive LLC, pp. 1-3 (2001).
*Use XML as a Skin Definition File*, Visual Studio Magazine, pp. 1-3 (Dec. 12, 2001). Pavlov, Victor, *Beta XML Cooktop*, www.xmlcooktop.com, pp. 1-9, (2001).
Wimpsett, Kim, *Stardock WindowBlinds 2.11*, CNET Networks, Inc., pp. 1-2 (1995-2002).
Wardell, Bradley, *Themes & Skins and Windows XP: a complete customization primer*, www.stardock.com, pp. 1-12, (2002).
*WindowBlinds:A Component of Object Desktop*; www.windowblinds.net; Starduck Net, Inc., pp. 1-19 (2000).
Crouch; AnimatedMenus.com *Newsflash Oct. 99 Issue*; www.elists.org/pipermail; pp. 1-4 (Oct. 1999).
Hyatt; *Writing Skinnable XUL and CSS*; www.mozilla.org; The Mozilla Organization; pp. 1-4; (2000).
*Success Stories*; www.animatedmenus.com; Animated Menus, Inc., pp. 1-5; (1997-2002).

* cited by examiner

Primary Examiner — William Bashore
Assistant Examiner — Mylinh Tran
(74) Attorney, Agent, or Firm — Lee & Hayes, PLLC (57) ABSTRACT A method and system for displaying information in a user interface of a computer program uses documents, such as mark-up language documents and style-sheet language documents, to specify how the user interface is to be rendered on a computer display. The user interface has a variety of possible appearances, or "skins."

15 Claims, 9 Drawing Sheets

METHOD AND SYSTEM FOR DISPLAYING INFORMATION ON A USER INTERFACE

TECHNICAL FIELD

The present invention relates generally to user interface and, more particularly to user interface that are rendered according to a mark-up language document or a combination of mark-up language documents.

BACKGROUND OF THE INVENTION

The user interface is an important part of any program that requires user interaction. Typical elements of a user interface include buttons, menus, dialog boxes and scroll bars. In addition to giving the user the ability to interact with a program, a user interface also serves to create an appropriate atmosphere for the user by, for example, displaying certain color schemes and background motifs.

User interfaces of various types have been around for decades. As computers have become more and more powerful, user interfaces have become increasingly complex. However, user interfaces still tend to be hard-coded into the programs that they serve. That is, most programs are designed so that the layout of the user interface is included as part of the same executable file as the rest of the program. Thus, it is very difficult, if not impossible, for individual users to customize their own interfaces, unless the program itself provides this functionality. Even then, a user is limited to making those changes in the user interface permitted by the program. The vendor of the program likewise has difficulty making changes to the user interface without editing the code of the program itself and releasing a new version of the program with the edits incorporated.

SUMMARY OF THE INVENTION

The invention is generally directed to a method and system for displaying information in a user interface of a computer program, in which one or more documents, such as mark-up language documents and style-sheet language documents, are used to specify how the user interface is to be rendered on a computer display. According to various embodiments of the invention, the user interface has a variety of possible appearances, or "skins," each of which has a style sheet language document associated with it. In some embodiments, different functions of the computer program are carried out by plug-in software modules. When executed, each software module passes one or more documents to the user interface. The document or documents specify the content and the appearance of the user interface. For example, one of the plug-in software modules may provide a mark-up language document that specifies the content of a window as well as a style-sheet language document to specify how the content is to be laid out on the user interface. By separating the content of the user interface from the appearance of the user interface, the invention allows the user interface to be easily changed "on the fly" to give the user a different look and feel as needed.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION OF THE INVENTION

Prior to proceeding with a description of the various embodiments of the invention, a description of the computer and networking environment in which various embodiments of the invention may be practiced will now be provided.

Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers. Accordingly, the terms "computer," "client," and "server" as used herein include personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
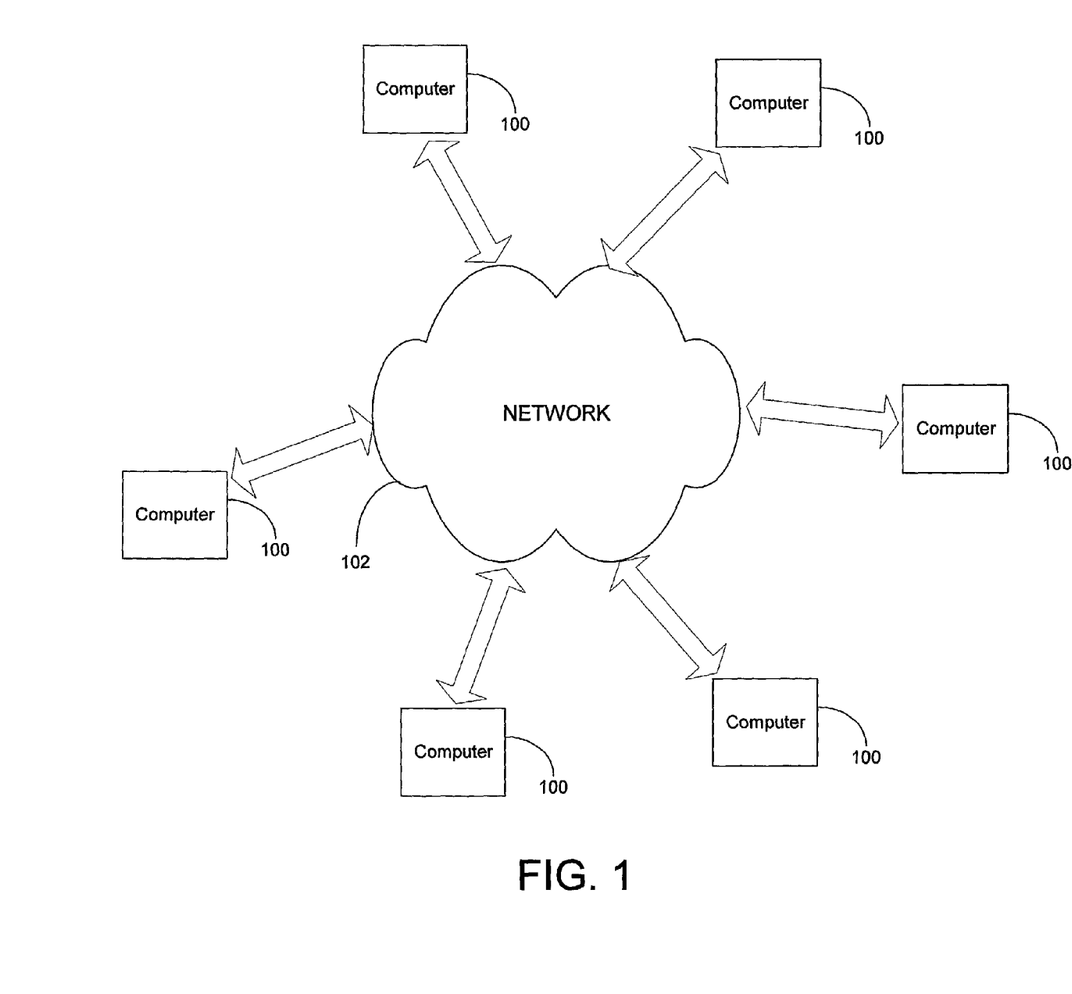
FIG. 1 shows an example of a computer network in which the invention may be practiced.

An example of a networked environment in which the invention may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
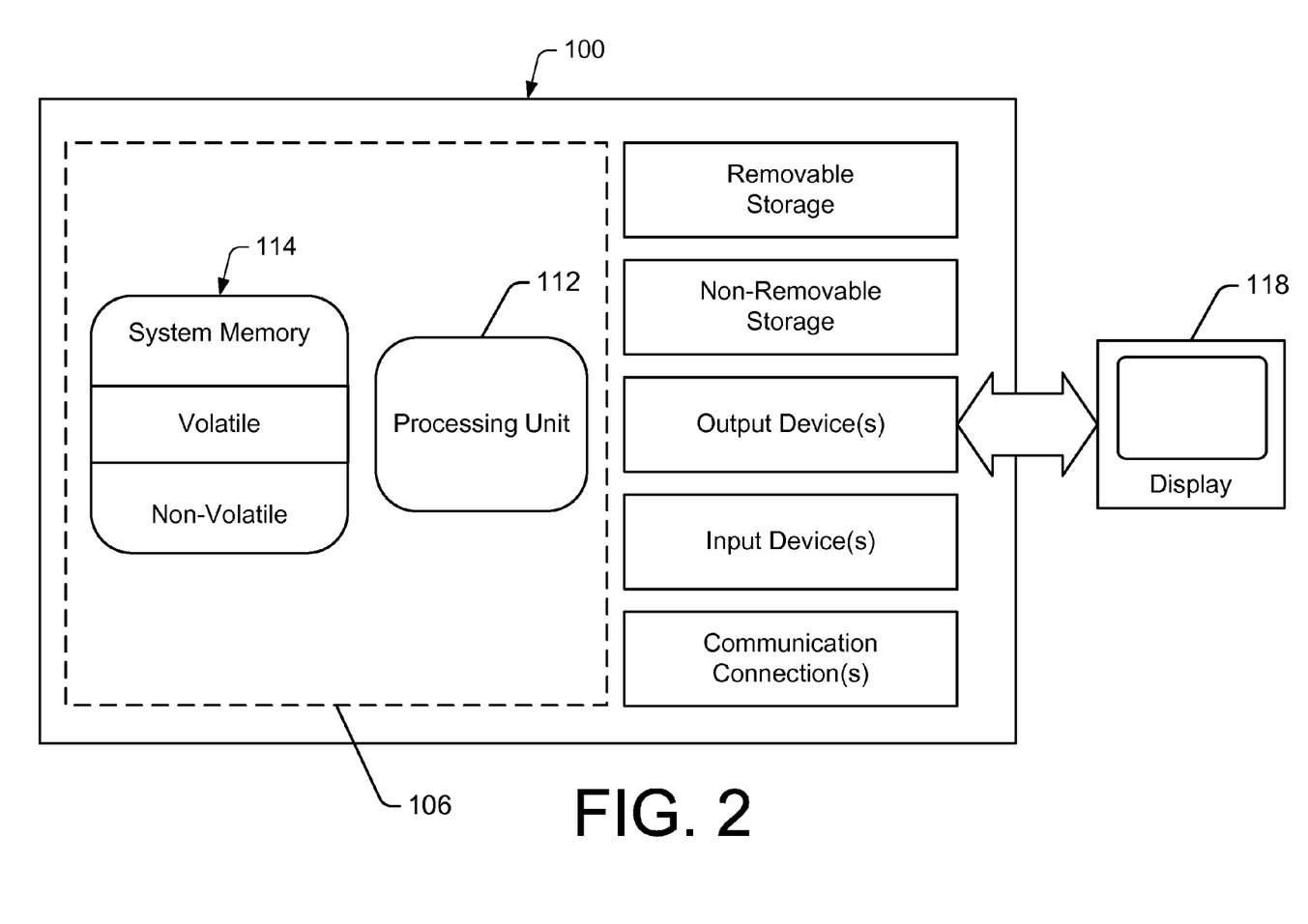
FIG. 2 shows an example of a computer on which at least some parts of the invention may be implemented.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 118, speakers, a printer, etc. may also be included. All these devices are well known in the art and need not be discussed at length here.

The invention is generally directed to a method and system for displaying information on a user interface, in which the display characteristics of the user interface are defined in a mark-up language document that is separate from the program module or modules that define the functional features of the user interface. In effect, the mark-up language document defines the "skin" that is worn by the user interface. This allows the "look and feel" of the user interface to be easily modified to suit, for example, different types of users.

As used herein, the term "mark up language" refers to any computer interpretable language that describes the structure of a document. Examples of mark-up languages include Standard Generalized Mark-up Language (SGML) and all of its variants, including Hypertext Mark-up Language (HTML), Extensible Mark-up Language (XML) and Extensible Style Sheet Language (XSL). Furthermore, the term "mark-up language document" refers to any document that contains mark-up language. Finally, the term "window" refers to a defined area of a user interface whose borders may or may not be visible. A user interface may have one window or multiple windows, and each window may contain any number of other windows. Although windows are often depicted as rectangular, they may be any shape.

Figure 3A:
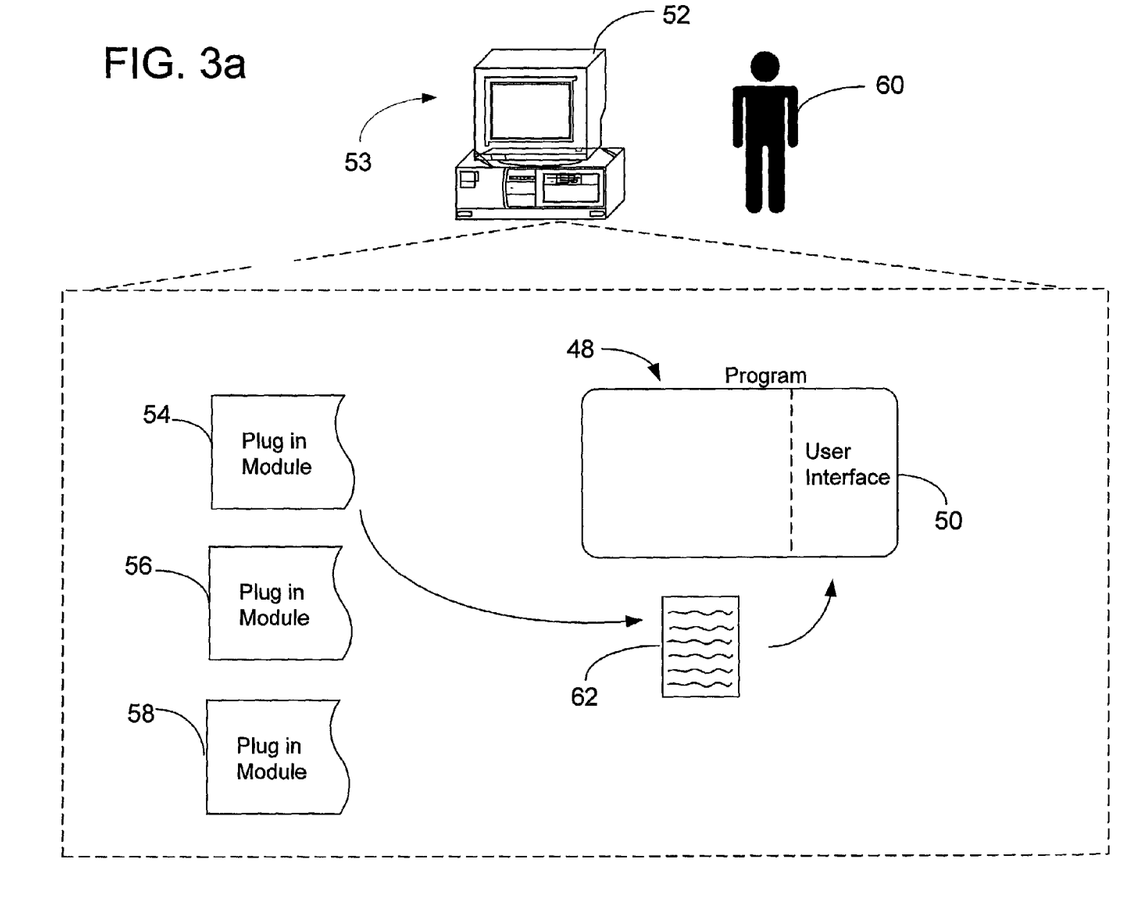
FIG. 3a. shows an example of an embodiment of the invention.

Referring to FIG. 3a, an example software architecture used for implementing various embodiments of the invention will now be described. In this architecture, a program 48 has a user interface module 50 that renders a user interface on a display 52 of a computer 53. The user interface module 50 is capable of processing at least one type of mark-up language and includes a parser, a browser, or similar components. The program 48 of this example is assumed to have multiple functions that it can perform for a user 60. The data and instructions for carrying out each of these functions are provided by a set of plug-in modules. In FIG. 3a, three such plug-in modules are shown and are labeled 54, 56 and 58. It is understood, however, that there may be any number of plug-in modules. Each plug-in module corresponds to a different function of the program. For example, if the program is a database management program, one of the plug-in modules might provide the functionality to manage a financial database, while another one of the plug-in modules might provide the functionality to manage an employee record database.

When a plug-in module is loaded by the user interface module 50, the plug-in module provides the user interface module 50 with a document. The document includes data that represents how the user interface module 50 is to display a window on the display 52. The document may be implemented as, for example, a mark-up language document or a style-sheet language document.

When a user 60 invokes the program in various embodiments of the invention, the program initially executes the user interface module 50. The user 60 is then given the opportunity to choose which function he or she would like to perform with the program. Continuing with the database example of the previous paragraph, if the user chooses, via the user interface module 50, to create a new financial database, then the user interface module 50 loads the plug-in module that has financial database functionality. For example, if the plug-in module 54 has the financial database functionality, the user interface module 50 loads the plug-in module 54. The plug-in module 54 provides a document 62 to the user interface module 50 by, for example, passing a pointer referencing the document 62 to the user interface module 50. The user interface module 50 then renders one or more windows on the display 52 in the manner specified by the document 62. These windows may include pull-down menus, pop-up menus and dialog boxes.

Figure 3B:
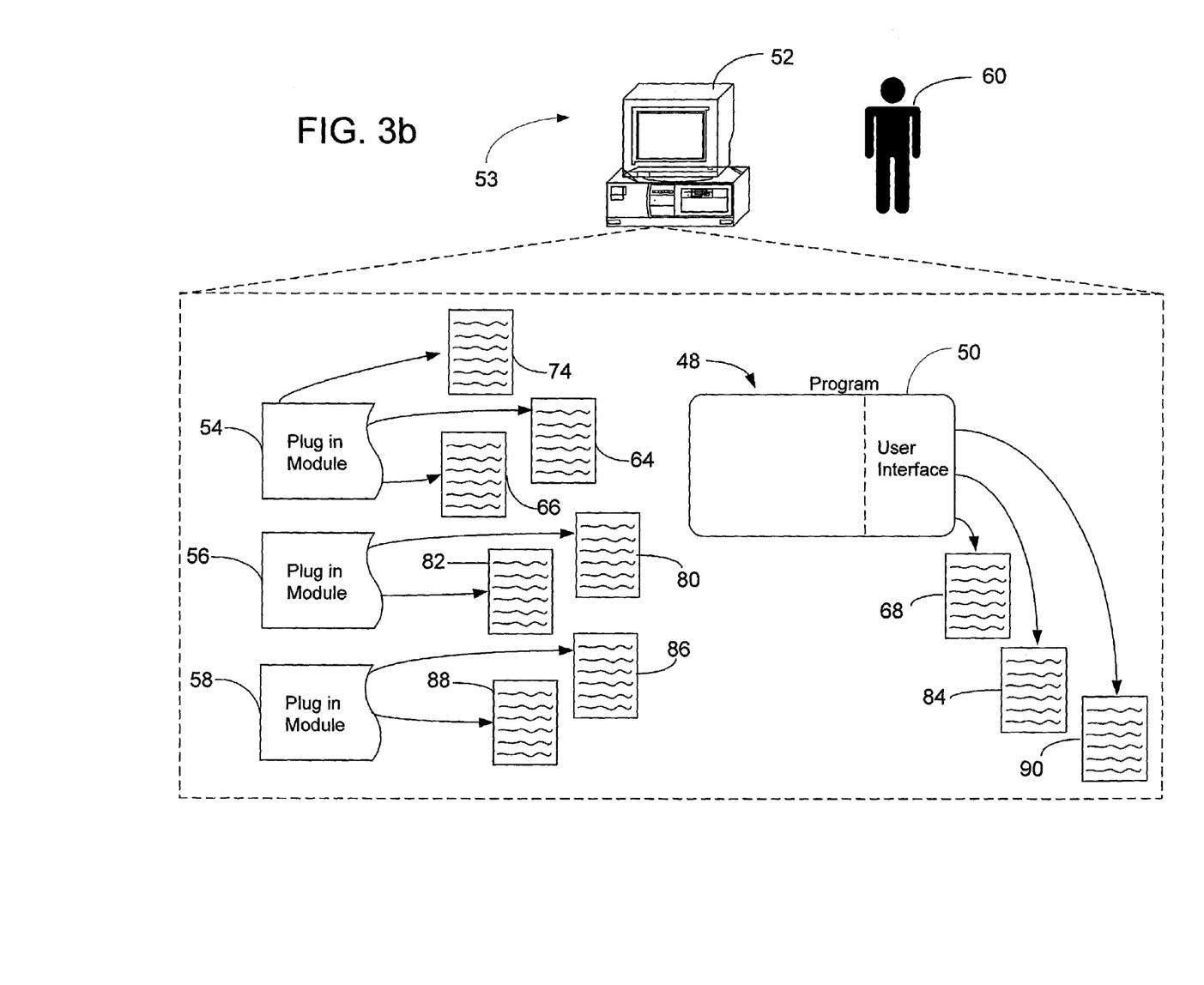
FIG. 3b. shows an example of another embodiment of the invention.

Referring to FIG. 3b, another example software architecture that may be used to implement various embodiments of the invention will now be described. The example architecture of FIG. 3b includes all of the components illustrated in FIG. 3a and discussed previously. Instead of a single mark-up document language defining the user interface 50, however, two documents provide this information in FIG. 3b. One document, referred to as the first document, includes information as to the content of one or more windows that are to be displayed by the user interface module 50. Another document, referred to as the second document, includes information as to the style in which the content specified by the first document is to be displayed. Finally, yet another document, referred to as the third document, is created based on data from both the first and second documents, and includes information as to both the content and the style of windows that are to be displayed by the user interface module 50.

Referring again to FIG. 3b, an example of how the various components of the illustrated architecture interact will now be described. In this example, it is assumed that the program 48 is a database management program, and that the user 60 has chosen to create a financial record database via the user interface module 50. The user interface module 50 invokes the plug-in module 54. The plug-in module 54 executes and provides the first document 64 to the user interface module 50. The first document 64 may be implemented as a mark-up language document, such as an extensible mark-up language (XML) document. The plug-in module 54 also provides the second document 66 to the user interface module 50. The second document 66 may be implemented as a style-sheet language document, such as an extensible mark-Up language (XSL) document. The user interface module 50 uses the second document 66 and the first document 64 to create a third document 68. The third document 68 may be implemented as a hypertext mark-up language (HTML) document. The user interface module 50 then renders one or more windows on the display 52 using the third document 68.

In various embodiments of the invention, the first document 64 of FIG. 3b contains some or all of the data that is to appear in a window that gets displayed on the display device 52. If a menu, for example, is to be displayed, then the first document 64 contains the links that are to appear in the menu. The first document 64 may also contain text, headers or references to pictures that are to be loaded into a window on the display device 52. The first document 64 may be hard coded into a program, or may exist as a file that is separate from the program that uses it. Additionally, the first document 64 may exist prior to the execution of the program 48, or may be created during execution of the program 48.

An example of how the documents illustrated in FIG. 3*b* may be implemented and processed according to an embodiment of the invention will now be described. In this example, the user interface module 50 needs to display a menu to the user 60 (FIG. 3*b*). In this example, the first document 64 is implemented as an XML document, the second document 66 is implemented as an XSL document, and the third document 68 is implemented as an HTML document. Also in this example, the first document 64 has the general structure shown in Table 1.

TABLE 1

1. <?xml version="1.0"?>
2. <xmenu:menuxml xmlns:xmenu="http://www.microsoft.com">
3.     <xmenu:head>
4.         <xmenu:literal>...</xmenu:literal>
    </xmenu:head>
5.     <xmenu:menulist>
6.         <xmenu:menu>
7.             <xmenu:name>title</xmenu:name>
8.             <xmenu:id>id</xmenu:id>
9.             <xmenu:submenu>
10.                 <xmenu:name>
11.                     <xmenu:literal>...</xmenu:literal>
                </xmenu:name>
12.                 <xmenu:image>image path</xmenu:image>
            </xmenu:submenu>
            ...
            <xmenu:submenu>
                ...
            </xmenu:submenu>
        </xmenu:menu>
        ...
        <xmenu:menu>
        ...
        </xmenu:menu>
    </xmenu:menulist>
</xmenu:menuxml>

The tags used in the XML example of Table 1 are as follows:
1. XML declaration tag.
2. Root tag.
3. The contents of this tag should be placed into the <head> section of the HTML file.
4. All data inside of the <xmenu:literal> tag should be copied character-for-character into the HTML file.
5. Contains the list of menu items.
6. Contains one group of menu items and a corresponding header.
7. The title of the menu group header.
8. The id of the menu group. This can be used by the HTML code if necessary, or can be ignored.
9. Contains one menu item, which should appear under the header.
10. The name of the menu item. This will take the form of a hyperlink that the user can click on.
11. The contents of the <xmenu:literal> tag are to be copied character-for-character into the HTML file. This code defines the hyperlink.
12. The path to an image, which should be placed next to the menu item link.

A more specific example of XML code that may be used in the first document 64 to implement a menu window with hyperlinked selection items is shown in Table 2.

TABLE 2

```
<?xml version="1.0"?>
<xmenu:menuxml xmlns:xmenu="http://www.microsoft.com">
    <xmenu:head>
        <xmenu:literal>
            <script language="javascript">
                function callBack(a,b)
                {
                    var objControl = new
                    ActiveXObject("NSNavigator.IECallback")
                    objControl.OnClickSolution(a,b)
                }
            </script>
        </xmenu:literal>
    </xmenu:head>
```

According to various embodiments of the invention, the first document 64 is preprocessed to remove those characters that may not be recognizable in by certain implementations of the user interface 50. For example, the XML example of Table 1 (i.e. the first document 64) contains certain tags called <xmenu:literal>. All characters that appear between <xmenu:literal> tags are generally copied exactly as they appear into the final HTML file (i.e. the third document 68). In most cases, the characters between the <xmenu:literal> tags will be HTML code. HTML code is very similar to XML code in that they both use the same format for tags. A tag in HTML code or XML code starts with an opening bracket, has a name, and ends with a closing bracket. Because HTML tags are identical to XML tags, and because the characters between pairs of <xmenu:literal> tags usually contain HTML code that is to be copied exactly as it appears from the XML to the HTML, special precautions may be taken to ensure that the user interface module 50 does not confuse this HTML code with XML code and handle it improperly.

To ensure that all HTML code between a pair of <xmenu:literal> tags is handled properly during the XSL transformation, all tag brackets in the HTML code are stripped out and replaced with symbols that will not be recognized by the user interface module 50. Table 3 shows the characters that are replaced and the values with which they are replaced.

TABLE 3

| Original Character | Replacement Value |
| --- | --- |
| < | %nsxml:gt% |
| > | %nsxml:lt% |
| & | %nsxml:am% |

This transformation ensures that the code between each pair of <xmenu:literal> tags will not be confused for XML code. Once the final HTML code has been created, these coded values are then replaced with their original values.

Returning to the example XML code of Table 2, the opening and bracket tags of this HTML code are replaced with special characters that will not be confused for XML code. Once this is done the XML code is as shown in Table 4:

TABLE 4

```
<?xml version="1.0"?>
<xmenu:menuxml xmlns:xmenu="http://www.microsoft.com">
    <xmenu:head>
        <xmenu:literal>
            %nsxml:lt%script language="javascript"%nsxml:gt%
                function callBack(a,b)
                {
                    var objControl = new
```

TABLE 4-continued

```
        ActiveXObject("NSNavigator.IECallback")
        objControl.OnClickSolution(a,b)
      }
    %nsxml:lt%/script%nsxml:gt%
  </xmenu:literal>
</xmenu:head>
```

Referring again to FIG. 3b, the user interface 50 transforms the first document 64 into the third document 68 using the data contained in the second document 66. The second document 66 specifies how the data in the first document 64 is to be converted so that it can be properly displayed on the display 52. In effect, the second document 66 defines the "skin" that is worn by the first document 64. The second document 66 may be implemented with any coding method, style, or design. However, some embodiments of the invention may require the second document 66 to be implemented in a language that conforms to certain guidelines. In some embodiments, for example, it is preferable that the second document includes "literal" XML tags, such as the <xmenu:literal> tags shown in Table 4. In those embodiments, it is also preferable that the second document 66 be implemented in XSL, and that the XSL code has instructions that enable the user interface 50 to understand "literal" tags. As previously discussed, "literal" tags allow code from an XML document to be directly imported into an HTML document without any alteration. Table 5 shows an example of XSL code that may be included in the second document 66 to accomplish this.

TABLE 5

```
<xsl:template match="//xmenu:literal">
    <xsl:value-of/>
  </xsl:template>
```

To give a more specific example, assume that an XSL developer needs to insert code into the second document 66 to create a menu item hyperlink from the XML code of Table 4. The developer would simply insert the following code into the second document 66: <xsl:apply-templates select="./xmenu:name/xmenu:literal"/>

In some embodiments of the invention, it is preferable for the second document 66 and the user interface 50 to include support for hyperlinked menu items. For example, if the window that is to be displayed on the display device 52 is a pop-up menu with hyperlinked menu items, then it may be desirable for the second document 66 to be written in a dialect of XSL that supports hyperlinked menus, and for the user interface 50 to include a browser that can display the menu items as hyperlinks, such that when the user clicks the hyperlink, the program 48 will receive a notification and will be able to discern which item was clicked and what action should be taken as a result of the click. There are various methods available for allowing the program 48 to receive a notification when the user clicks on a hyperlink within the HTML document. Regardless of which method is used, the program should be able to discern not only that the user clicked some hyperlink, but also which window the click came from, and what action must be performed as a result of the click.

Referring again to FIG. 3b and to the example XML code of Table 4, the user interface 50 uses the second document 66 (which contains XSL code, in this example) to create the third document 68 (which contains HTML code, in this example).

As part of the conversion process, all of the code between the "literal" tags of the XML code is imported directly into the third document 68. This imported code includes the JAVA script shown in Table 6.

TABLE 6

```
<script language="javascript">
    function callBack(a,b)
    {
      var objControl = new ActiveXObject("NSNavigator.IECallback")
      objControl.OnClickSolution(a,b)
    }
</script>
```

The code of Table 6 defines an object, which can be used to create a connection from the user interface 50 back to a Component Object Model (COM) interface within the program. In this JAVA script code example, the COM name of the program is NSNavigator, and the interface name is IECallback. After the connection has been set up, the code calls the OnClickSolution function in the program. This notifies the program that a menu item has been clicked. Of course, the names given here are for the sake of example, only.

The JAVA script code and COM objects of Tables 2, 4 and 6 are meant to be examples of how communication may be set up between the user interface 50 and the program according to an embodiment of the invention. Other embodiments of the invention may not use COM and/or JAVA script at all. For example, the invention may be implemented using .NET assemblies and C# ("C Sharp").

Examples of how the invention can be used will now be provided with reference to FIGS. 4-8, and with appropriate reference to FIGS. 3a and 3b. As previously discussed, various embodiments of the invention use mark-up language documents to define how a user interface is to be displayed. In many embodiments, each individual window that is to be displayed has at least one mark-up language document associated with it. According to some of those embodiments, each window that is displayed has two mark-up language documents associated with it—one defining the contents and the functionality of the window and one defining how the contents are to be displayed. For example, assume that the program 48 of FIG. 3b is a drawing program, and the plug-in module 54 contains pictures and drawing tools that allow the user 60 to create a diagram of a corporate network. One of the pictures that the plug-in module 54 can insert into the diagram is a building icon. Each building icon represents a building of a corporation. Associated with each building icon is a set of properties that the user 60 can fill in. This allows the users to view the network diagram created by the user 60, place the cursor over a particular building, right click, and view those properties in a pop-up window, such as the pop-up windows 70 and 72 shown in FIG. 4. The user can then further click on menu items, show in FIG. 4 as hypertext links, and determine things such as which servers are in that building, which subnets, and so forth.

Figure 4:
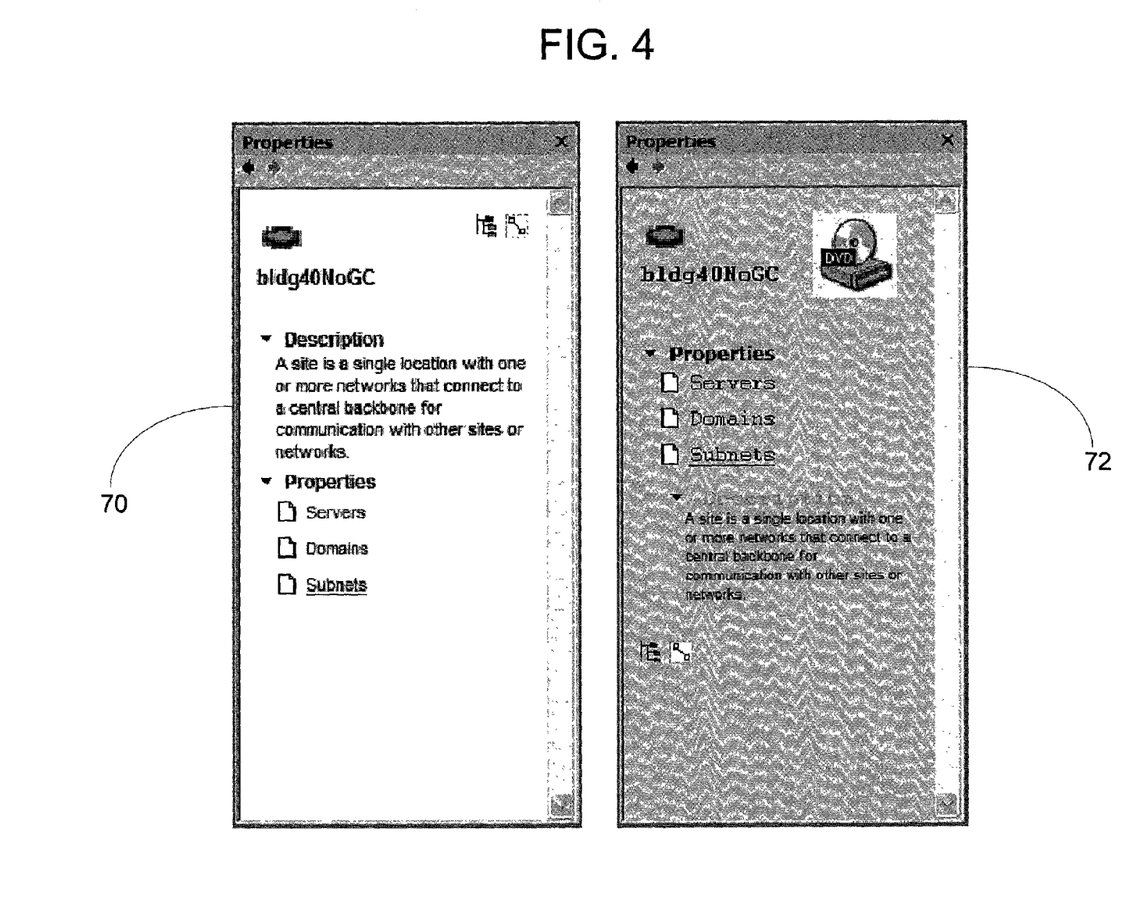
FIGS. 4-7 show examples of user interfaces in accordance with various embodiments of the invention.
Figure 5:
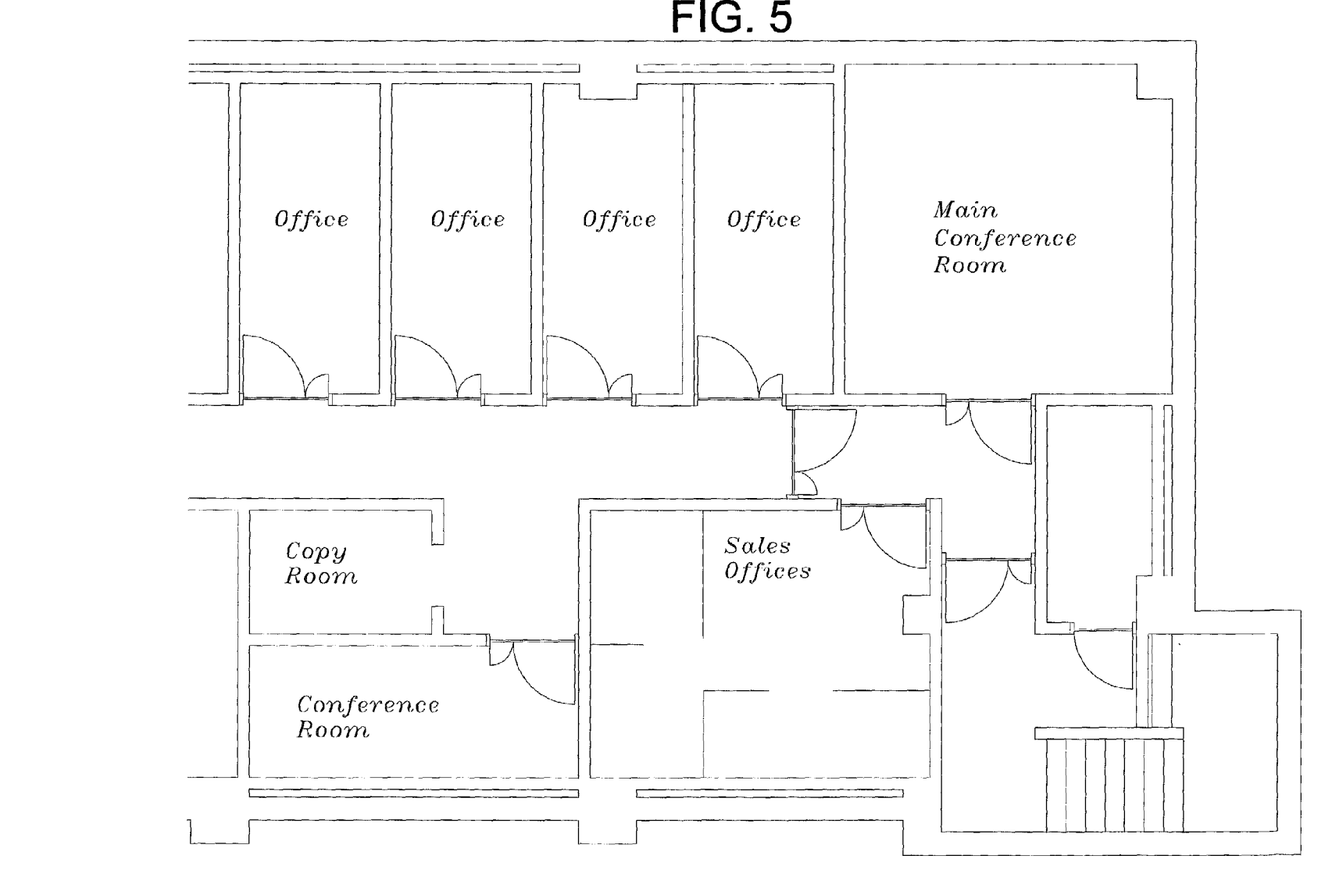
Figure 6:
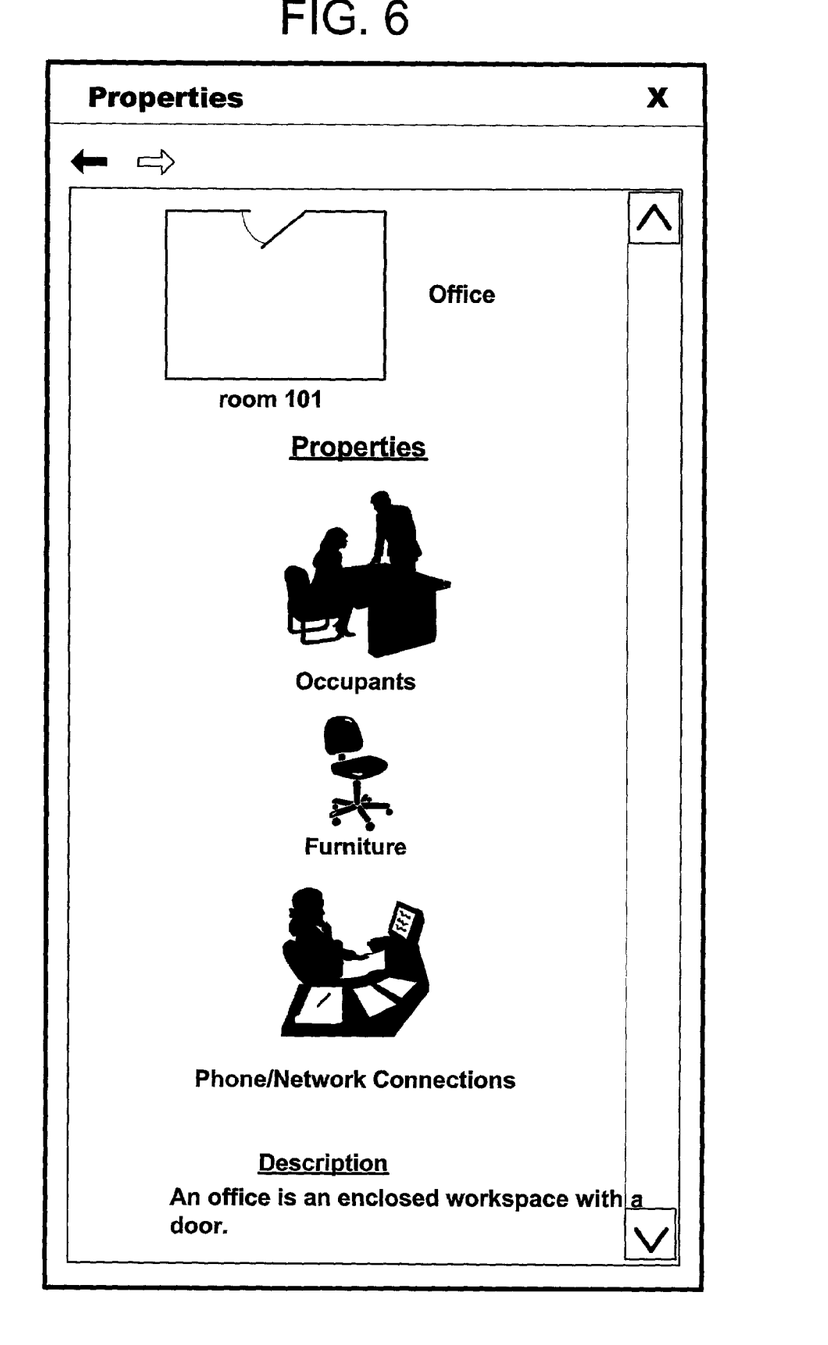
Figure 7:
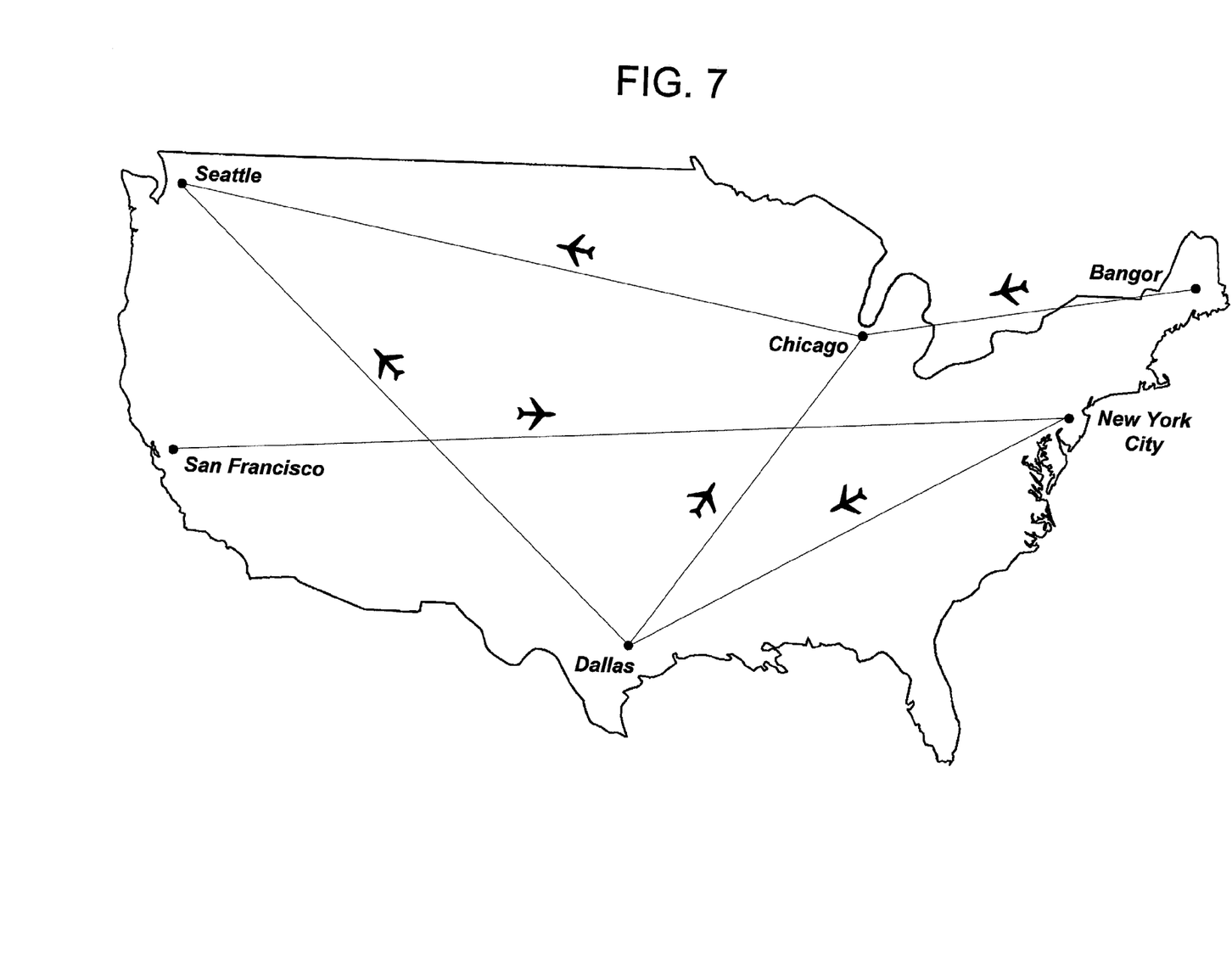
Figure 8:
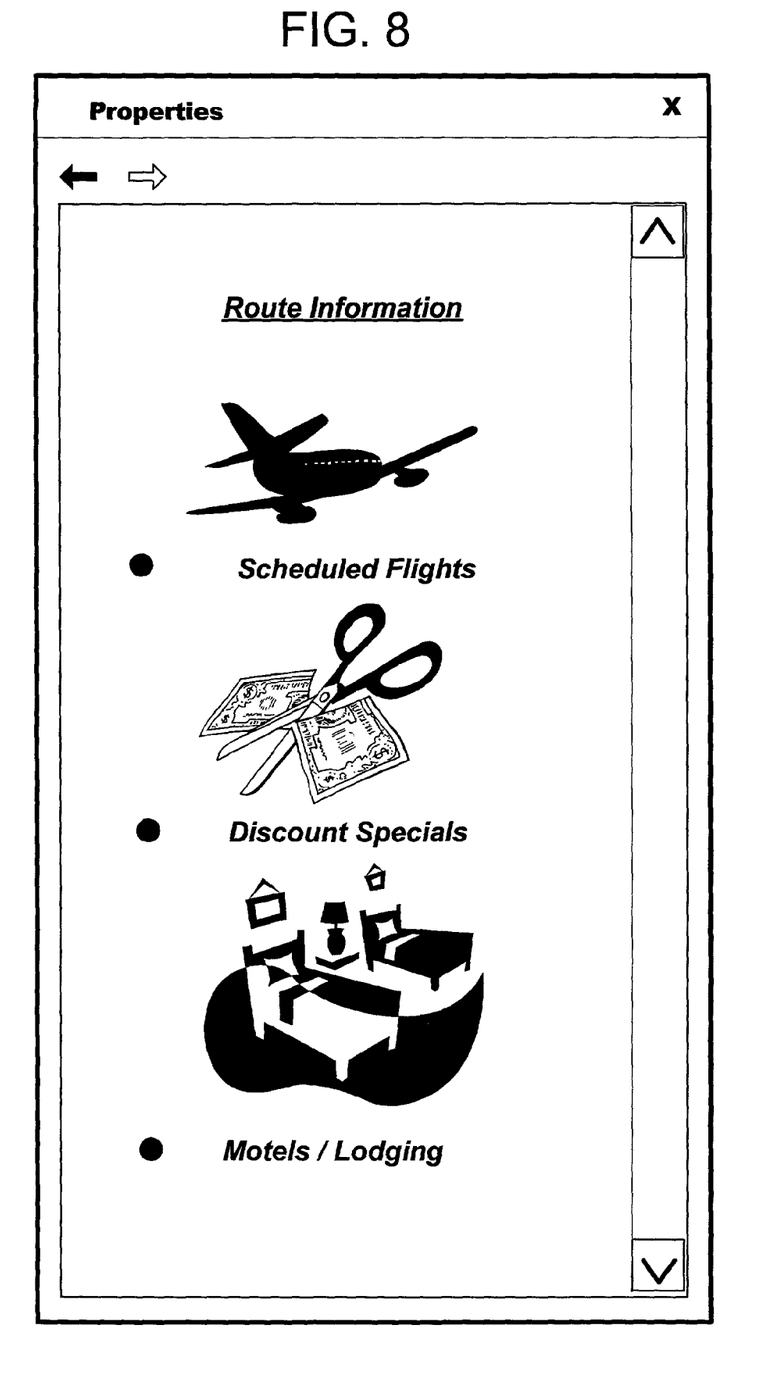
FIG. 8 shows an example user interface, including a pop-up window.

It is to be noted that the windows 70 and 72 of FIG. 4 each depict the same information, but each display the information in a different manner. In various embodiments of the invention, the contents of each window are specified by the same first document, while the layout of each window is specified by different second documents. So, for example, the plug-in module 54 provides the first mark-up language document 64 to convey the contents of both windows of FIG. 4. To enable the user interface 50 to display the first window 70, the plug-in module 54 provides the second document 66, but to enable the user interface 50 to display the alternative version of the second window, the window 72, the plug-in module 54 provides an alternative version of the second document, the document 74.

In various embodiments of the invention, different themes and motifs for the user interface of a program may each be specified in a different mark-up language document or set of mark-up language document. For example, assume once again that the program 48 of FIG. 3b is a drawing program. Further assume that the plug-in module 56 has pictures and drawing tools for rendering an office layout such as that shown in FIG. 5. The functionality defined by a first document 80 is that, once an office layout drawing is complete, a user can right-click on a room and find out what furniture, people, and network connections are in the room. A second document 82 defines how the individual room information is to be presented. In this example, the user interface 50 is implemented as a browser that takes the first document 80 which may be an XML document, passes it according to the second document 82, which may be an XSL document, and generates a third document 84, which may be an HTML document. The user interface 50 displays a pop-up window, shown in FIG. 6, based on the third document 84. The pop-up window of FIG. 6 has a motif that is appropriate for an office layout display.

In another example, assume once again that the program 48 of FIG. 3b is a drawing program. Further assume that the plug-in module 58 has pictures and drawing tools for rendering an airline route map such as that shown in FIG. 7. The functionality defined by a first document 86 is that a user can right click on a route on the route map and find out what flights are available, whether there are any discounts, and what lodging is available. A second document 88 defines how the individual room information is to be presented. In this example, the user interface 50 is implemented as a browser that takes the first document 86, which may be an XML document, parses it according to instructions in the second document 88, which may be an XSL document, and generates a third document 90, which may be an HTML document. The user interface 50 displays a pop-up window, shown in FIG. 8, based on the third document 90. The pop-up window of FIG. 8 has a motif that is appropriate for an airline route display.

It can thus be seen that a new a useful method and system for displaying information on a user interface has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for displaying a window on a user interface of a program, the method comprising:
   receiving a user selection corresponding to a function of the program, the user selection made from among a plurality of available functions of the program;
   executing a plug-in module in response to the user selection, the plug-in module comprising computer-executable instructions for implementing the function;
   receiving from the plug-in module a first document indicating content of the window and functionality available to the user based on the plug-in module, wherein the first document is an extensible mark-up language document;
   receiving, from the plug-in module, a second document indicating an appearance of the window, the second document being editable by the user to change the appearance of the window after the receiving, wherein the second document is an extensible style-sheet language document;
   formatting the first document with the second document to create a third document, the third document indicating the content, the functionality and the appearance of the window, wherein the third document is a hypertext mark-up language document; and
   displaying the window to the user in accordance with the third document, wherein the third document contains markers which the program uses to determine which one of a plurality of windows operated by the program is triggered when a hyperlink is selected by an end user.

2. One or more computer storage devices having stored thereon computer-executable instructions for performing the method of claim 1.

3. The method of claim 1, further comprising:
   processing the third document, to create a processed document, to remove any characters which are not recognized by the program;
   using the processed document to create a mark-up language representation of the window; and
   processing the mark-up language representation to display the window on a display device within the user interface, wherein the appearance of the window is in accordance with the set of display characteristics indicated by the processed document.

4. The method of claim 1, wherein the first document comprises one or more literal XML tags which are used in the second document, wherein characters between a pair of literal XML tags are imported without alteration into a hypertext mark-up language (HTML) document.

5. A computer-implemented method for displaying a window on a user interface of a drawing program, the method comprising:
   receiving an end user selection of a drawing function of the drawing program, the drawing function used for drawing a type of drawing;
   executing a plug-in module in response to the user selection, the plug-in module comprising computer-executable instructions and plug-in data for implementing the drawing function;
   retrieving a first document from the plug-in module indicating a functionality associated with the type of drawing;
   processing the first document to remove characters not recognized by the drawing program;
   retrieving a second document from the plug-in module indicating a graphical style associated with the type of drawing;
   inserting a marker at a hyperlink in the first document, the marker indicating which of a plurality of windows is accessed when the hyperlink is selected;
   formatting the first document with the second document to create a third document, wherein the third document is implemented to provide both the functionality and the graphical style of the user interface;
   enabling functions with respect to the user interface based on the third document; and
   rendering the window on a display device within the user interface according to the graphical style described by the third document, wherein the first document specifies a functionality of menu items that are to be displayed in the window.

6. A computer-readable medium having a tangible embodiment and having stored thereon computer-executable instructions for performing the method of claim 5.

7. The method of claim 5, the method further comprising:
executing another plug-in module corresponding to a drawing type chosen by the user, wherein the plug-in module comprises computer-executable instructions and data;
replacing, by the drawing program, text in the second document with an image from the other plug-in module; and
receiving from the plug-in module a reference to the document.

8. The method of claim 5, wherein the one of the first document or the second document is a mark-up language document.

9. The method of claim 5, wherein the second document is a style-sheet language document.

10. One or more computer storage devices having stored thereon computer-executable instructions for performing the method of claim 5.

11. The method of claim 5, wherein the second document specifies a layout of menu items that are to be displayed in the window, and wherein each plug-in module is comprised of binary code and one or more images.

12. The method of claim 5 wherein the first document from the first plug-in module specifies a functionality of menu items that are to be displayed in the window, the second document specifies the appearance of the menu items, and one of the first document or the second document comprises one or more literal tags.

13. A system for displaying a user interface of a computer program, the computer program having a plurality of different functions that are selectable by an end user, the system comprising:
a processor;
a display;
computer-readable storage media accessible by the processor, the computer-readable storage media having stored thereon:
a plug-in module configured to implement at least one function of the computer program;
a first mark-up language document provided by the plug-in module, the first mark-up language document comprising data representing functionality available to the end user based on the plug-in module, wherein the first document specifies a functionality of menu items that are to be displayed;
a second mark-up language document provided by the plug-in module, comprising a style-sheet language document, the style-sheet language document comprising data representing a display style that is associated with the plug-in module, wherein the style-sheet language document is editable by the end user, including subsequent to implementation of the style sheet language document, to change the appearance of the image that is rendered by the program; and
a third mark-up language document created by the system, the third mark-up language document created based on processing the first mark-up language document with the second mark-up language document, the third mark-up language document representing both the functionality and the display style associated with the plug-in module, the user interface being implemented based on the third mark-up language document and being responsive to markers within the third document that determine which one of a plurality of windows is triggered when a hyperlink is selected by an end user.

14. The system of claim 13, wherein the first mark-up language document is an extensible mark-up language document, and the third mark-up language document is a hypertext mark-up language document.

15. The system of claim 13, wherein the user interface comprises a browser, and wherein the browser creates the third mark-up language document by processing the first mark-up language document in accordance with the style-sheet language document.

* * * * *